June 11, 1968     O. C. ROGERS     3,387,867
JOINT CONSTRUCTION
Original Filed Feb. 18, 1966
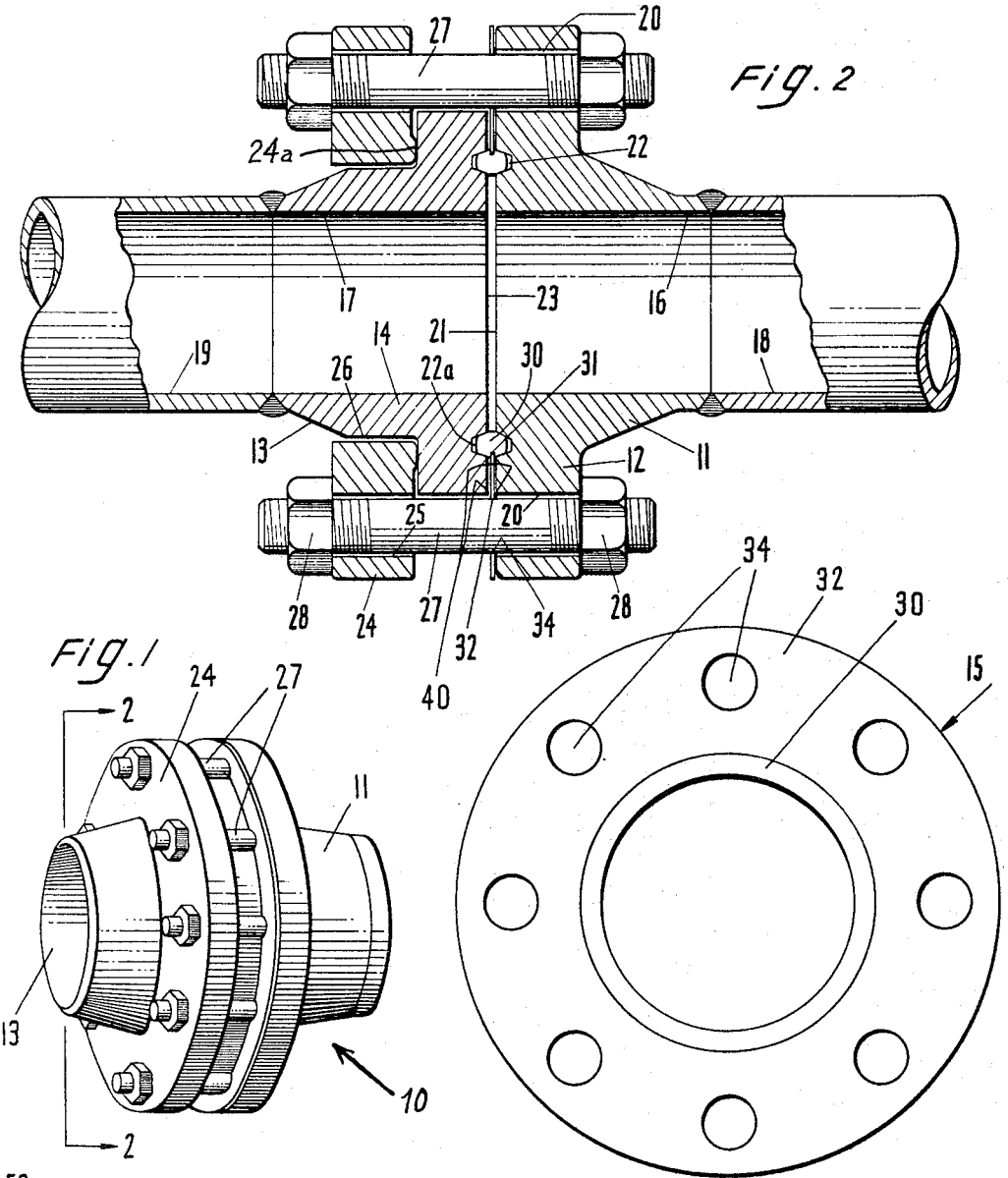
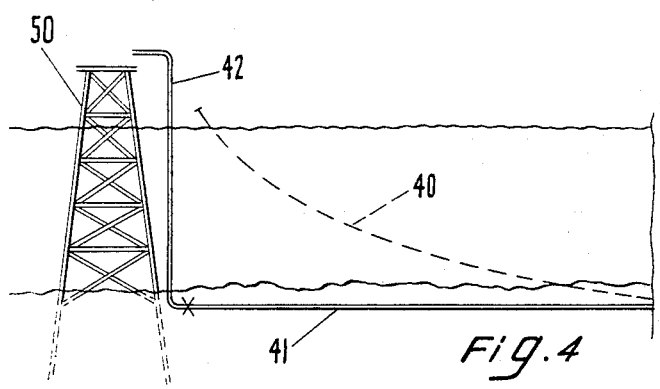
INVENTOR
Oliver C. Roger
BY
Wolf, Greenfield & Hieken 3,387,867
JOINT CONSTRUCTION
Oliver C. Rogers, 1815 Giaise St.,
Marrero, La. 70072
Continuation of application Ser. No. 528,653, Feb. 18, 1966. This application Feb. 2, 1967, Ser. No. 622,860
2 Claims. (Cl. 285—336)

ABSTRACT OF THE DISCLOSURE

A high pressure pipe joint construction wherein a sealing ring is disposed in facing seal seats in the flanges of pipe sections. The ring carries a disc with alignment holes radially beyond the ring that align with holes on the flange of one pipe section and the holes in a collar to position the ring in the seats. A bead on the collar aligned in an axial direction with the ring pulls the pipe sections together when the bolts and nuts that pass through the aligned holes are tightened.

This application is a continuation of my application Ser. No. 528,653, filed Feb. 18, 1966, entitled, Joint Construction.

The present invention relates to joint constructions and more particularly to novel and improved high pressure resistant pipe joint constructions.

Sealing rings or gaskets are commonly employed in high pressure pipe joints and often comprise a metal sealing ring dimensioned so as to be forced into seating grooves on facing surfaces of coupling flanges. In high pressure coupling devices which are assembled in locations where handling is difficult and visibility limited, there is some problem in locating the sealing ring in proper registration with the seats provided in the coupling flanges previous to locking the flanges together as by the use of bolts. For example, in making underwater joints in large pipes at depths of 150 feet or more it often takes several hours to join two sections of pipe using conventional pipe joint connection means.

An important object of this invention is to provide an improved joint construction which facilitates rapid assembly by a user with little or no need for viewing of the construction during assembly.

Another important object of this invention is to provide a joint construction in accordance with the preceding object which is inexpensive, yet, highly efficient and durable.

Still another object of this invention is to provide a novel method of joining sections of pipe where visibility is severely limited and manual manipulation difficult.

Another important object of this invention is to reduce or eliminate the bending moment exerted on the adjacent flanges of pipe sections between which sealing rings are disposed.

According to the invention, the pipe joint construction has a first hollow joint member carrying an outwardly extending flange defining a first plurality of alignment holes and having a joining face. The joining face defines a continuous annular seal seat for a sealing ring. A second hollow joint member is constructed and arranged to mate with the first member and also has an outwardly extending flange carrying a second plurality of alignment holes spaced to register with the first mentioned alignment holes. Preferably the second member carries a seal seat for coacting with the seal seat of the first member. A joining face is provided on the second hollow joint member. A sealing ring lies in the seal seats between the joining faces of the first and second member and the sealing ring carries a positioning disc extending outwardly thereof and defining a plurality of alignment holes in registration with and lying between the first and second plurality of alignment holes of the first and second members. Alignment means, which are preferably a plurality of bolts, pass through the holes in the disc to align the ring in the seal seat previous to pressure coupling of the members and means are provided for locking the first and second members in joining relationship with conduits or passageways in each of the members preferably in alignment with each other and sealed by the sealing ring. The pressure applied on the joint members to hold them together is aligned with the ring to eliminate any bending moment on the joint flanges and canting of the several parts.

According to the method of this invention the sealing ring is automatically positioned in the seat by bringing disc bolt holes of the disc into registration with the flange bolt holes which comprise the alignment means. The first and second members are then secured together by the bolts. Thus, by the use of the disc, the sealing ring is automatically positioned in the seat and the user need not visibly see the positioning of the ring so long as the holes are in registration.

These and other objects, features and advantages of the invention will be better understood and appreciated from the following specification when read in connection with the accompanying drawings in which:

FIG. 1 is a perspective view of a preferred embodiment of the joint construction in accordance with this invention;

FIG. 2 is a cross section taken through line 2—2 thereof;

FIG. 3 is a front view of a novel sealing ring structure thereof; and,

FIG. 4 is a semi-diagrammatic showing illustrating a use of the joint construction of this invention.

With reference now to the drawings and more particularly FIGS. 1–3, a pipe joint construction is generally illustrated at 10 and has a first or fixed hollow joint member 11 which has an integral continuous joining flange 12 extending radially of the axis of its passageway 16. A second or pressure hollow joining member 13 carries a radially extending pressure flange 14 and a sealing ring 15 is clamped between the flanges 12 and 14 to form a high pressure joint therebetween with an interconnecting passageway defined by the bores 16 and 17. The joint members in turn can be connected at their ends with conventional pipe lengths 18 and 19.

In the preferred embodiment, the flange 12 of member 11 defines a plurality of eight bolt holes 20 preferably equally spaced in a circular array about the flange. A joining face 21 is at one end of the flanged member 11 preferably lying perpendicular to the axis of the passageway 16 and carrying an annular groove 22. Groove 22 acts as a conventional ring seat as will be more fully described. The annular groove 22 can be of various known seat cross sections including a V-shaped cross section or it can have three continuous walls as shown in the preferred embodiment. The material of the flanged member is preferably a hard metal such as iron but can comprise copper, steel or other known pipe coupling materials.

The pressure flanged member 13 has a joining face 23 corresponding to face 21 and carries an annular groove 22a sized and dimensioned substantially the same as groove 22 and the two grooves are in registration with each other when the flanged members 11 and 13 are joined together as shown in FIG. 2. A pressure collar or ring 24 carries a plurality of alignment and joining holes 25 corresponding to the number and position of holes 20. The collar 24 seats in an annular recess 26 formed by the flanged member 13, as best seen in FIG. 2. Collar 24 carries eight bolts 27 with corresponding nuts 28 providing for pressing of the flanged member 13 against the flanged member 11 in the joint construction.

In FIG. 2 it will also be noted that the collar 24 is provided with a bead 24a which is substantially aligned axially with the grooves 22 and 22a. The force therefore applied by the collar against the flange 14 is aligned with the grooves for reasons which will be made clear below.

Lying between the members 11 and 13 is the novel and improved sealing ring 15 of this invention. The sealing ring has an annular seal portion 30 preferably made of a hard metal such as steel but may comprise other known gasket materials. Preferably the seal portion 30 is harder than the material of the flanged members and deforms the grooves 22 and 22a when nuts 28 are tightened. However, the seal portion can be of a softer material than the flanged members and be deformed to form a high pressure resistant joint construction.

The seal portion 30 has a diameter substantially equal to the diameters of grooves 22 and 22a so that it can be seated in the grooves and upon tightening of nuts 28, pressed firmly into engagement with the grooves to form a high pressure resistant seal in the joint construction.

When the seal portion 30 of ring 15 is disposed in the grooves 22 and 22a, the compression load applied to the flanges by the collar 24 through bead 24a is fairly aligned with the collar and therefore a minimum of bending movement is applied to the flanges 14. It is of course necessary in the high pressure applications for which this invention is intended to draw tightly on the nuts and bolts to compress the seal portion 30 in the grooves, and in the absence of the bead 24a, very great bending movements would be applied to the flanges to distort the pipe sections and perhaps cause canting of the sections.

The annular seal portion 30 perferably has an annular groove 31 extending thereabout on its outside edge. A positioning and alignment disc 32 is fixed in groove 31 and lies in a plane perpendicular to the axis of the passageways 16 and 17 and parallel to the joining surfaces 23 and 21. The disc 32 can be fixed within the annular groove 31 by conventional means such as the use of adhesives, fasteners or welds. The outer diameter of disc 32 extends at least to the passageways 20 and, in the preferred embodiment, the outer diameter of the flange 12. Eight holes 34 are positioned in a circular path on the disc spaced equally apart and adapted to lie in registration with holes 20 and 25. The holes 20, 25 and 34 are all of substantially the same diameter. The diameter of each bolt 27 is substantially the same as the diameter of each hole to permit only sliding of the bolts in the holes with a minimum of clearance between the hole walls and the outside of the bolts (the spacing is exaggerated slightly in FIG. 2).

The disc 32 is preferably Teflon but can be formed of any rigid material such as impregnated figerglass or other fabric, steel, brass, plastics and the like. Preferably the thickness of the disc is slightly smaller than the width of the space between joining faces 21 and 23 when the joint is completed as best shown in FIG. 2.

Assembly of the joint structure of this invention can be carried out without the need for the assembler viewing the joining or mating surfaces 21 and 23 or the sealing ring in their predetermined positions. Thus, bolts 27 can be passed through bores 20 with nuts 28 attached behind the flange 12. The assembler can then merely grasp the sealing ring and by manipulation align the holes 34 with the bolts and slide the sealing ring thereon. Following this, the flanged member 13 can be positioned with its groove 22a engaging the seal portion 30 and the bolts pass through the pressure collar 24 whereupon nuts 28 can be tightened. As long as the disc portion 32 of the sealing ring has holes in registration with holes 20 and 25, there is positive assurance that the seal portion 30 is properly aligned with the grooves 22 and 22a forming the seal seat and the assembler can safely tighten the nuts 28 to provide a suitable high pressure seal. Only three bolts 27 spaced 120° apart on the flange 12 need be positioned and tightened during the initial positioning of the seal portion in the seat. The use of the three bolts assures proper alignment with the centers of the sealing ring and flange members coinciding. The additional bolts can be positioned after the first three have been secured. As in conventionally known, pressure exerted by tightening of the bolts 27 will form a positive seal between the joint members and the sealing ring.

The joint construction of this invention is particularly suitable for use in joining pipe sections underwater. As diagrammatically illustrated in FIG. 4, a pipe section 40 can be laid from the shore, or from another point, to an off shore platform 50 whereupon a flanged member such as 11 is attached to the end of the pipe section and it is lowered to the position shown at 41 which may be a ditch in the sea bed. A stand-pipe 42 is then provided with a flanged member such as 13 by welding, brazing or other conventional means and lowered as shown in FIG. 4. A diver can then make the actual connection to the pipe section end and stand-pipe end by positioning a sealing ring such as 15 and collar 24 employing the positioning technique described above. At great depths, the use of the sealing ring is particularly advantageous since the water is often cloudy and often obscures viewing of the joint construction. Of course the method of this invention can be used in any location to join two elongated pipe sections together with their central axes coinciding. The sealing ring can also be positioned by placing the holes 34 in registration with holes 20 and later passing the bolts therethrough.

While specific embodiments of this invention have been shown and described, it should be understood that many variations thereof are possible. For example, the fixed flanged member 11 can be joined to an identical fixed flanged member in place of the member 13 and its collar 24 in joint constructions of the type shown. Thus collar 24 can be integral with member 13. Similarly, the joints can be bolted together or otherwise attached by other conventional means. The pipe sections 18 and 19 can be welded or joined to the flanged members by other conventional means. The number of bolt holes can be varied, but preferably at least three holes are used spaced 120° apart about the circular flanges. An important concept of the invention is the use of a sealing ring with a substantially planar outwardly extending disc carrying alignment means adapted to register with alignment means on at least one of the flanged members. The disc portion 32 can be split radially to facilitate assembly on the seal portion 30. The outer annular edge of each facing flange portion indicated at 40 can be offset or provided with an outwardly facing annular step to facilitate proper placement and alignment of the disc 32.

In view of the many modifications possible, this invention is to be limited only by the spirit and scope of the appended claims.

What is claimed is:

1. A pipe joint construction comprising, a first hollow joint member having an outwardly extending flange defining a first plurality of alignment holes and a first joining face, a groove in said first joining face defining a continuous seal seat, a second hollow joint member constructed and arranged to mate with said first member, a second joining face on the outwardly extending flange of said second hollow joint member and a groove in said second face defining a second continuous seal seat in register with the groove in the first joining face, a collar disposed about the second hollow joint member on the side distal from the first member and providing a second plurality of alignment holes positioned to register with the first-mentioned alignment holes, a metallic sealing ring lying in part in each of said seal seats and extending radially outward beyond said joining faces with said sealing ring having a cross section which is different from the cross section of the seal seats, a bead provided on the collar and engaging the second member in alignment in an axial direction with the grooves and the ring and through which force is applied by the collar to the second member when the first member and collar are drawn together to avoid bending stresses in the second member, said ring carrying a substantially rigid positioning disc of smaller thickness than the thickness of said ring and extending outwardly thereof radially beyond the first and second alignment holes and defining a plurality of alignment holes lying between and in registration with said first and second plurality of alignment holes, said ring being aligned with the seal seats when the alignment holes of the disc are aligned with the holes in the first member and collar, bolts passing through said alignment holes in said disc, first member and collar to align said ring in said seal seat, nuts screwed onto the bolts locking said first and second members in joining relationship with said hollow members in alignment with each other by drawing the collar toward the first member, said first and second joint members having a different hardness value than the hardness value of said metallic sealing ring.

2. A pipe joint construction in accordance with claim 1, wherein said ring is composed of hard metal and said first and second members are composed of a softer metal whereby the seal seats conform in shape to the ring when the nuts and bolts are tightened.

References Cited

UNITED STATES PATENTS

| | | | |
|---|---|---|---|
| 2,291,709 | 8/1942 | Goetze | 285—336 |
| 2,434,224 | 1/1948 | Paul | 285—368 |
| 2,504,634 | 4/1950 | Boschi | 285—336 |
| 2,699,344 | 1/1955 | Bissell | 285—336 |
| 2,780,483 | 2/1957 | Kessler | 285—336 |
| 2,878,041 | 3/1959 | Hobbs | 285—336 |
| 3,305,250 | 2/1967 | Hall | 285—336 |

EDWARD C. ALLEN, *Primary Examiner.*

CARL W. TOMLIN, *Examiner.*

W. L. SHEDD, *Assistant Examiner.*